Oct. 23, 1934.  W. S. TELFORD  1,977,900
TRACTION DEVICE
Filed Jan. 25, 1934
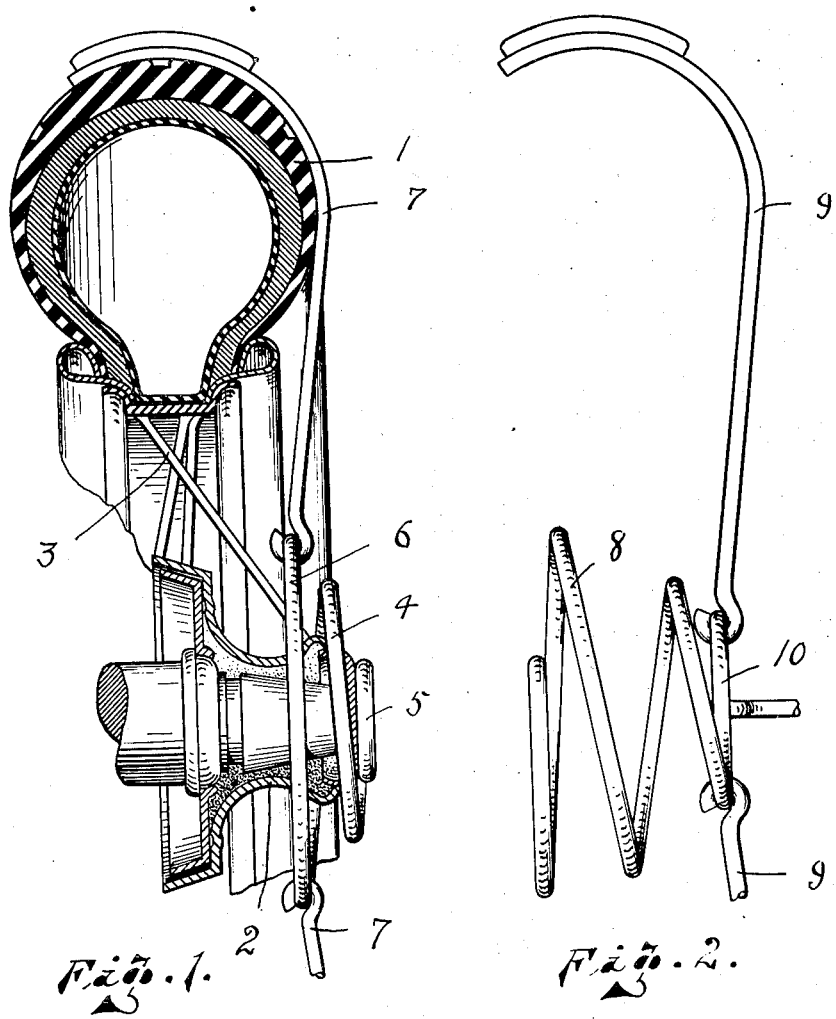
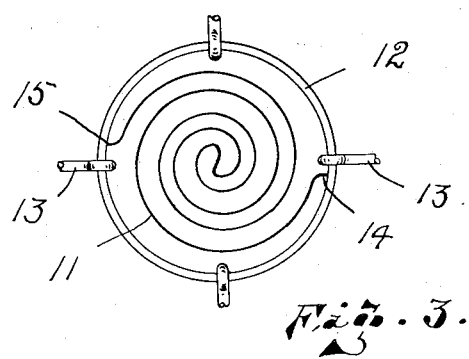
INVENTOR.
Worthington S. Telford.
BY Geo. Stevens
ATTORNEY.

Patented Oct. 23, 1934

1,977,900

UNITED STATES PATENT OFFICE 1,977,900

TRACTION DEVICE

Worthington S. Telford, Duluth, Minn.

Application January 25, 1934, Serial No. 708,218

3 Claims. (Cl. 152—14)

This invention relates to traction devices for vehicle wheels and has special reference to such devices readily adjustable to and from the tire of an automobile wheel, particularly when mired or otherwise lacking in tractability.

The principal object is to provide an efficient and dependable device of this character having no parts requiring adjustment or operation other than is inherent within the unit itself, as I am aware that somewhat similar devices are old in the art but all, so far as known, require adjustable mechanism for attaching or releasing the device to or from the wheel.

Another object is to provide such a device readily applicable to different forms of automobile wheels.

Still other objects and advantages of the invention will appear in the following description thereof.

Referring now to the accompanying drawing, wherein like reference characters indicate like parts:

Figure 1 is a sectional view of a portion of a wire wheel as commonly found upon automobiles with a portion of the device embodying the invention applied thereto.

Figure 2 is an elevation of a portion of a modified form of the invention.

Figure 3 is a plan view of a portion of a device embodying a still further modification thereof.

In Figure 1, 1 represents the tire of an automobile wire wheel and 2 the hub of same. The latter are usually comparatively large in diameter, at least in respect to the diameter of the wheel, and the spokes 3 are disposed somewhat diagonally opposite with some reaching well out towards the extreme outer portion of the hub; while it is well known that other forms of wheels, for instance those known as artillery wheels, have comparatively straight spokes, providing more room about the hub or nave of the wheel.

For the wire wheel I have illustrated, the traction element comprises a contractile helical spring 4 having the smaller or apex convolution 5 thereof smaller in diameter than the average face of the outermost end of the hub 2; while the innermost convolution 6 is materially larger than the apex 5 so that it may be readily forced inwardly for convenient application of the hooks 7 over the tire of the wheel, in which stressed position the spring 4 is shown in Figure 1. When thus applied and the manual inward pressure is released the convolutions of the spring will assume substantially parallel alignment in the same vertical plane thus pulling outwardly the innermost ends of the shanks of the hooks which are pivotally attached to the larger inner convolution 6 of the spring.

It is to be understood that the arcuate outer terminus of the hooks 7 in relation to the diameter of the device is such that when the innermost convolution or ring of the spring is well inwardly of a plane with the outer wall of the tire the ends of the hooks will readily slip over and past the center of the extreme circumferential diameter of the tire so that as the spring is released it will tend to bring the innermost attached ends of the hooks outwardly again to an approximate plane with the outer surface of the tire and thereby rotate inwardly the arcuate portions of the hooks, or increase their grip upon the tire. For example it is evident that as the inner end of the hook 7 is brought outwardly parallel with the axis of the wheel, the center of rotation of the arcuate end of the hook is coincident with the center of a transverse section of the tire as illustrated, and but a slight movement outwardly of the shanks of the hooks tends to increase their grip upon the tire. As the spring is constantly biased towards such stress the hooks are insured of safe keeping upon the tire irrespective of their movement otherwise as by abnormal rotation of the wheel.

In Figure 2 I have shown the holding or carrying spring 8 as being helical but normally expansive and the hooks 9 similar to the hook 7 as pivotally attached to the smallest convolution or ring 10 of the spring while the larger or opposite end of the spring is designed to be first engaged against the spokes or disc of a wheel and then the smaller convolution thrust inwardly by hand until the hooks are slipped inwardly beyond the extreme diameter of the tire so that when pressure against the spring is released its expansive tendency will further rotate the hooks onto the tire in exactly the same manner previously described by the contractile effect of the spring 4.

It is obvious that the arcuate ends of the hooks 7 or 9 may be equipped with any form of antiskid device such as rubber, teeth, or the like.

In Figure 3 is illustrated a modified form of spring, the convolutions or coils of which are designed to lie normally in the same plane, and the spring 11 within the ring 12, which latter carries the hooks 13, is attached at opposite ends to opposite sides of the ring as at 14 and 15. It is readily evident that the numerous convolutions of the spring are for the purpose of augmenting its resiliency to permit of the ring being readily forced inwardly about the hub while the center portion of the convolution will impinge against the outermost end of the hub irrespective of its size as long as it is materially smaller than the ring.

It is quite apparent that the device is exceedingly simple and most readily applied to a wheel of an automobile even when mired, or otherwise ineffective for traction purposes, as any desired number of mud hooks, depending of course on the number carried upon the spring member, may be readily hooked over the upper portion of the wheel even without any stress whatever upon the spring and then when the lowermost ones adjacent the ground are applied all that is necessary is to force that portion of the carrier ring to which the lower ones are attached inwardly sufficiently far to permit of their overcoming the extreme diameter of the wheel, when release of the ring and return to normalcy of same by the spring will insure perfect installation of the device on the wheel; it being understood that in the embodiment shown in Figure 2 the larger innermost convolutions of the spring are in constant engagement with the spokes or disc of the wheel as the case may be.

Having thus described my invention, what I claim and desire to secure by Letters Patent, is:

1. A traction device for vehicle wheels comprising a holding ring, tire engaging hooks extending radially from said ring and pivotally attached thereto, and resilient means carried by the ring for engagement with the wheel to normally stress the hooks against the tire after the device is applied to the wheel.

2. A traction device for vehicle wheels including a plurality of radially assembled hook-like members for overlapping engagement with the tire of the wheel and an axially resilient support for said members to which they are pivotally attached.

3. A traction device for vehicle wheels comprising a resilient helical spring disposed axially of said wheel, and radially disposed hook-like members pivotally attached to one terminal annulus of the spring.

WORTHINGTON S. TELFORD.